United States Patent [19]
Wise

[11] 3,715,646
[45] Feb. 6, 1973

[54] TRACING FEED RATE STEERING CONTROL

[75] Inventor: Robert G. Wise, Loveland, Ohio

[73] Assignee: Cincinnati Milacron Inc., Cincinnati, Ohio

[22] Filed: July 21, 1971

[21] Appl. No.: 164,591

[52] U.S. Cl. .....................318/632, 318/39, 318/633
[51] Int. Cl. ................................................G05b 11/01
[58] Field of Search.................318/578, 633, 632, 39

[56] References Cited
UNITED STATES PATENTS

| | | | |
|---|---|---|---|
| 3,568,029 | 3/1971 | Bollinger | 318/578 |
| 3,481,577 | 12/1969 | Fling | 318/578 X |
| 3,579,069 | 5/1971 | Reuteler | 318/578 |
| 3,582,749 | 6/1971 | Wenzel | 318/578 |

*Primary Examiner*—Benjamin Dobeck
*Attorney*—Howard T. Keiser et al.

[57] ABSTRACT

An improved electronic tracing control for automatically steering the direction of the command feedrate vector to maintain a substantially zero quadrature error.

4 Claims, 3 Drawing Figures

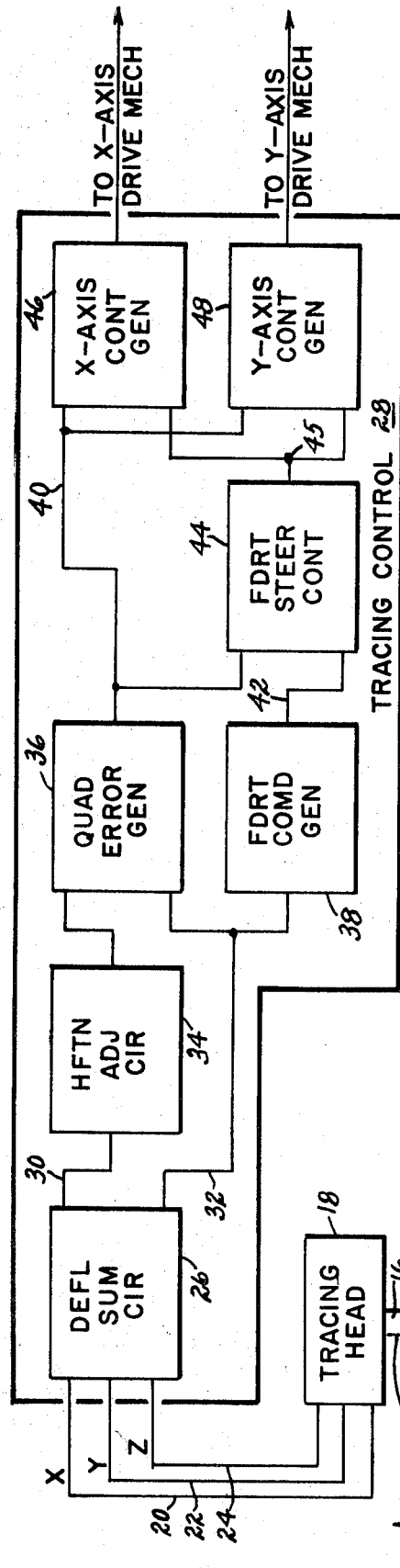
Fig. 1
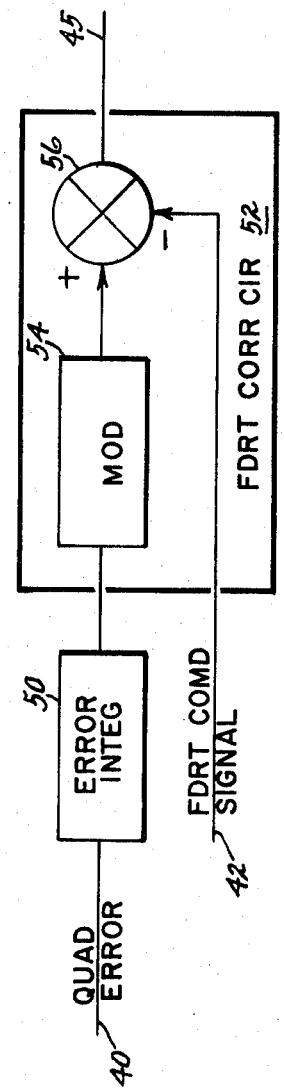
Fig. 2
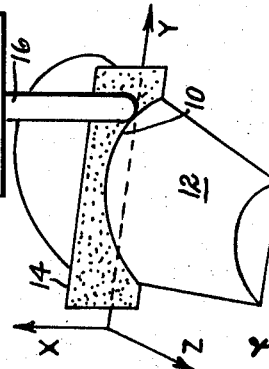
INVENTOR
ROBERT G. WISE
BY
ATTORNEYS

TRACING FEED RATE STEERING CONTROL

BACKGROUND OF THE INVENTION

The invention relates general to the area of tracing controls; and specifically, the invention provides an apparatus for improving the accuracy of the path of a tracing finger as it traces the configuration of a model.

The invention is for use on a machine having a tracing head with a tracking finger in contact with model. Transducers in the tracing head produce deflection signals to a tracing control. The tracing control produces the appropriate drive signals to driving mechanisms on the machine for moving the tracing finger around the model. The general construction and theory of operation of tracing controls are well-known in the art, and a comprehensive detailed description of any particular control will not aid the disclosure of the present invention. Applicant will only briefly review the theory and detail only that portion which is relevant to the present invention.

Generally, the tracing finger follows a cross section of the model within a predetermined tracing plane. For simplicity, the tracing plane will be defined parallel to one of the orthogonal coordinate planes of the machine; and further, the tracing finger will be assumed to only experience deflections within the tracing plane. Tracing heads are generally constructed with transducers producing deflections signals coinciding with the coordinate axes of the machine. The deflection signals are received by the tracing control and combined to produce a tracing error signal. The tracing error signal can also be considered to be composed of two vectors within the tracing plane and existing at the point of contact of the tracing finger on the model, i.e., the tracing point. The first vector or feed rate vector is tangent to the model at the tracing point and has a magnitude representing a predetermined value of velocity. The second vector or quadrature vector is perpendicular to the model at the tracing point and has a magnitude representing the error in the position of the tracing finger relative to the model. In other words, the quadrature vector is responsible for maintaining the tracing finger in constant contact with the model and therefore defines the accuracy of the tracing process. The tracing control must respond to the deflection signals from the tracing head and produce drive signals to the tracing machine which maintain the tangential velocity of the tracing finger at a predetermined value while holding the deflection of the tracing finger perpendicular to the model to a predetermined value, i.e., the hang free to null deflection.

In theory, most tracing controls are capable of accomplishing this result. However, there are certain variables which introduce tracing errors as a result of the physical act of mechanically tracing over the model. For example, friction between the tracing finger and the model will introduce error. The magnitude of friction is a function of the surface finish and other conditions on the surface of the model. Another source of error arises from the varying spring constants in the transducers in each directional axis within the tracing head. With most tracing heads, this is especially a problem when tracing a model surface that is displaced 45 degrees from the axis of the tracing finger. Since this geometry should produce equal deflections in two of the axes, an error caused by unequal spring constants will be most apparent. One further related error is introduced when tracing fingers of different lengths are used. Each new tracing finger length will result in a new spring constant in the directions perpendicular to the axis of the tracing finger. Consequently, the mechanical gain in each system changes, and errors result in the tracing output. A further source of error may arise from mechanical misalignments of the transducers in the tracing head with respect to the coordinate axes.

Each of the conditions above can introduce a slight rotation of the feed rate vector which is ideally produced tangent to the model at the tracing point. This non-tangential feed rate vector will cause the tracing control to stabilize with some quadrature error. In other words, the tracing control will maintain an orientation of the tracing finger on the model which is displaced from the hang free to null position. The displaced position of the tracing finger will cause a relatively constant oversize or undersize error in the tracing process.

Applicant discloses an improved tracing control for automatically steering the feed rate vector to its ideal tangential position, thereby maintaining the quadrature error at zero. Applicant's apparatus is operative regardless of the cause of the feed rate vector rotation and therefore is free of the disadvantages discussed above.

SUMMARY OF THE INVENTION

The present invention claims an improved tracing control of the type producing an error signal representing erroneous deflections within a tracing plane and perpendicular to a model surface and a command signal representing a predetermined feed rate vector oriented about a line in the tracing plane and tangent to the model surface. A feed rate steering control is operative to steer the direction of the feed rate vector as a function of the error signal thereby bringing the feed rate vector in coincidence with the tangent line and driving the error signal to zero.

BRIEF DESCRIPTION OF THE DRAWINGS

FIG. 1 is a general block diagram of a tracing control containing the invention.

FIG. 2 is block diagram illustrating the basic components of the invention.

DESCRIPTION OF THE PREFERRED EMBODIMENT

Figure 3:
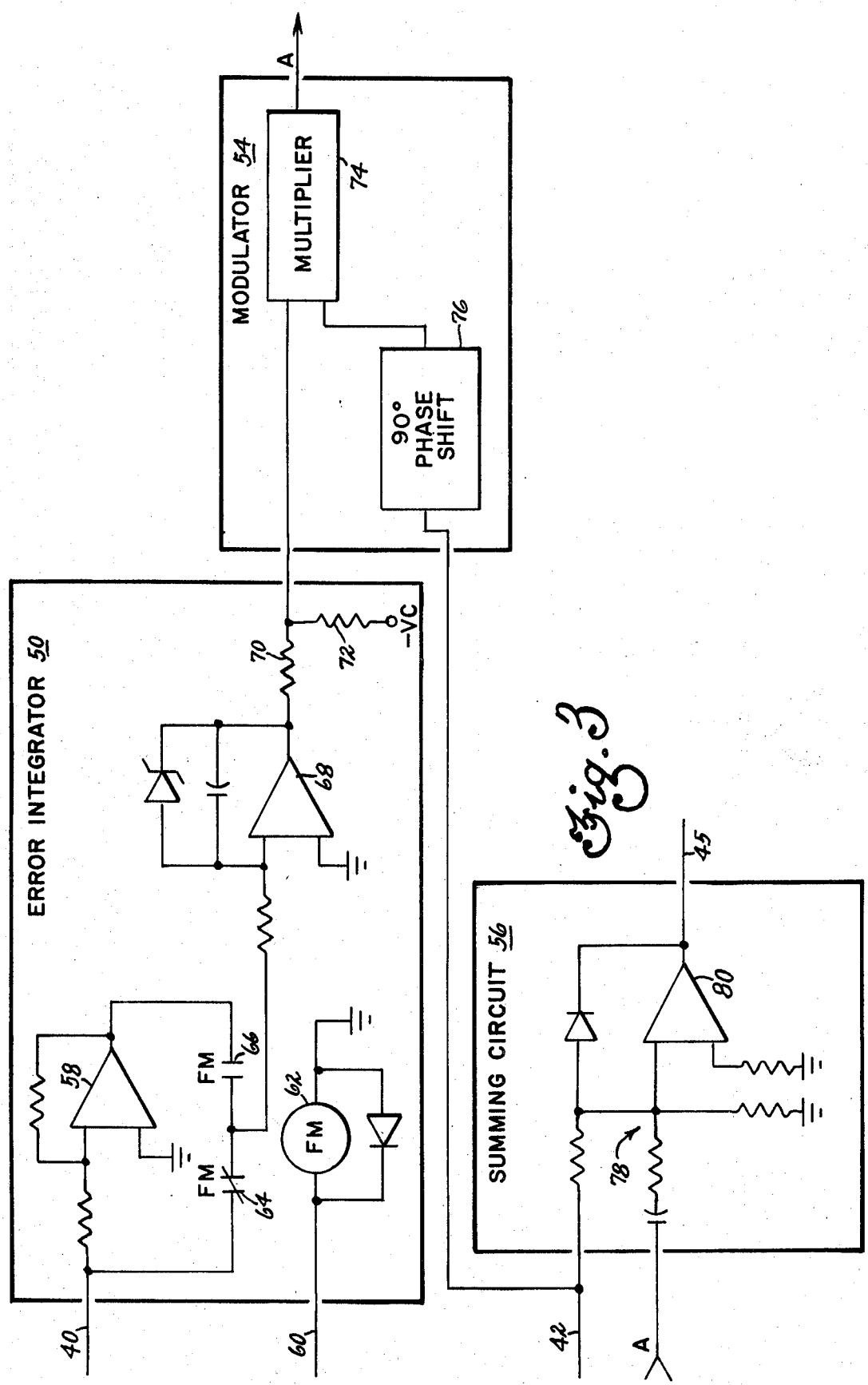
FIG. 3 is a detailed schematic diagram of the invention.

FIG. 1 is a general block diagram of a tracing control including the invention. A cross-section line 10 of a model 12 which lies in a tracing plane 14 is being traced by a tracing finger 16. As indicated in the Fig., the tracing plane 14 is parallel to the coordinate plane defined by the X and Y axes. The tracing finger 16 is part of a tracing head 18 which is mounted on a machine (not shown) in a standard manner. The tracing head 18 contains transducers (not shown) producing X axis, Y axis and Z axis deflection signals on the output lines 20, 22 and 24, respectively. A deflection summing circuit 26 contained in the tracing control 28 produces a total deflection signal on an output line 30 and a tracing plane deflection signal on an output line 32. A hang free to null adjustment circuit 34 modifies the total deflection signal by a hang free to null bias to produce a total tracing error signal. This causes the tracing control to null out or stabilize the tracing finger in a position which is displaced from the mechanical null position. Consequently, the tracing head may distinguish between overdeflection and underdeflection. This technique is well-known in the art. A quadrature error generator 36 is responsive to the tracing error signal to produce, on output line 40, a quadrature error signal representing a tracing error in the tracing plane perpendicular to the surface of the model 12 at the tracing point. In other words, this signal represents a quadrature vector defining the distance and direction the tracing finger is displaced form the hang free to null position. A feed rate command generator 38 produces, on output line 42, a feed rate command rate signal representing a predetermined velocity in the tracing plane tangent to the surface of the model 12 at the tracing point. This signal represents a feed rate vector defining the direction and magnitude of the commanded velocity.

As mentioned earlier, there are several conditions which will skew the feed rate vector from its tangent position. This produces a quadrature error which the prior art systems did not automatically eliminate. The present invention discloses a feed rate steering control 44 which is responsive to the quadrature error signal and the feed rate command signal. The feed rate steering control 44 automatically rotates the feed rate vector to its ideal tangent position as a function of the quadrature error signal thereby holding the quadrature error signal at a substantially zero value. The corrected feed rate command signal on line 45 and the quadrature error signal are inputs to X-axis and Y-axis control generators 46 and 48, respectively. The control generators reduce the input signals to the appropriate coordinate axis components and produce drive signals from the tracing control to the corresponding driving mechanisms for moving the machine in a manner causing the tracing finger to accurately trace the cross section 10 of the model 12 in a tracing place 14.

FIG. 2 is block diagram illustrating the basic components of the invention. An error integrator 50 and feed rate correction circuit 52 combine to form a feed rate steering control. The quadrature error signal on line 40 is an input to the error integrator 50 which produces a control signal having a magnitude that is a function of the time average value of the quadrature error signal. The control signal has a sign that is dependent on the direction of the quadrature error. A phase modulation circuit 54 is responsive to the control signal and produces a steering signal having a magnitude that is a function of the control signal magnitude that is a function of the control signal magnitude and a phase angle that is shifted 90° out of phase with the feed rate command signal. The phase shift occurs in a direction defined by the sign of the control signal. A summing circuit 56 is responsive to the steering signal and the feed rate command signal and sums said signals to produce a corrected feed rate command signal. The corrected command signal represents a feed rate vector having a magnitude equal to the predetermined feed rate value and direction coincident with the tangent to the model at the tracing point.

FIG. 3 is a detailed schematic diagram of the invention. The quadrature error signal on line 40 is input to an inverter amplifier 58 contained in the error integrator 50. A quadrature direction signal is input on line 60 to a coil 62 of a flux module. The normally open contacts 66 and normally closed contacts 64 are operative to switch the quadrature error signal or the inverse thereof as a function of the direction of the quadrature error signal. Consequently, the quadrature error or its inversion is an input to an integrating amplifier 68, which integrates the quadrature error signal. After the output of amplifier 68 passes through the voltage divider comprised of resistors 70 and 72, a control signal is produced from the integrator 50. The control signal is modulated onto a carrier by multiplication in the carrier circuit 74 with a multiplier signal 90° out of phase with the command signal. The carrier signal is created by shifting the phase of the command signal in the 90° phase shift circuit 76. The product of the multiplication is a steering signal having an amplitude and phase relation to the carrier signal as a function of the amplitude and sign, respectively, of the control signal. The steering signal is an input to a resistive summing network 78 contained in the summing circuit 56. The sum of the steering signal and the feed rate command signal passes through an amplifier 80, and the summing circuit 56 produces a corrected feed rate command signal on the output line 45.

While the invention has been illustrated in some detail according to the preferred embodiments shown in the accompanying drawings and while the preferred illustrated embodiments have been described in some detail, there is no intention to thus limit the invention to such details. On the contrary, it is intended to cover all modifications, alterations and equivalents falling within the spirit and scope of the appended claims.

What is claimed is:

1. An electronic tracing control comprised in part of apparatus for producing a quadrature error signal and a feed rate command signal, wherein the improvement comprises:
    a. means responsive to the quadrature error signal for producing a control signal as function of the time average value of the quadrature error signal; and
    b. means responsive to the control signal and the feed rate command signal for steering the feedrate command signal as a function of the control signal to maintain the quadrature error signal at a substantially zero value.

2. An electronic tracing control comprised in part of apparatus for producing an error signal representing an erroneous deflection in a direction perpendicular to a model surface at a tracing point and a command signal representing a predetermined tracing velocity oriented at a small angle to a tangent to the model surface at the tracing point, wherein the improvement comprises:
    a. means responsive to the error signal for producing a control signal as a function of the time average value of the error signal; and
    b. means responsive to the control signal and the command signal for producing a corrected command signal representing a velocity in a direction coincident with the tangent to the model surface at the tracing point, whereby said error signal is maintained at a substantially zero value.

3. An electronic tracing control comprised in part of apparatus for producing an error signal representing erroneous deflections in a direction perpendicular to a model surface at a tracing point and a command signal representing a predetermined tracing velocity oriented at a small angle to a tangent to the model surface at the tracing point, wherein the improvement comprises:
   a. means responsive to the error signal for integrating the error signal to produce a control signal;
   b. means responsive to the control signal for producing a steering signal modulated as a function of the control signal and 90° out of phase with the command signal; and
   c. means for receiving and summing the steering signal and the command signal to produce a corrected command signal defining a velocity in a direction coincident with the tangent to the model surface at the tracing point.

4. An electronic tracing control comprised in part of apparatus for producing an error signal representing erroneous deflections in a direction perpendicular to a model surface at a tracing point, a command signal representing a predetermined velocity along a line intersecting at a small angle a tangent to the model surface at the tracing point and direction signal representing the direction of the velocity along said line, wherein the improvement comprises:
   a. an inverting amplifier responsive to the error signal for producing an inverted error signal;
   b. a switching circuit responsive to the direction signal, the error signal and the inverted error signal for selectively producing the error signal and the inverted error signal as a function of the direction of the predetermined velocity;
   c. an integrating amplifier connected to the switching circuit and producing a control signal;
   d. a 90° phase shift circuit responsive to the command signal for producing a reference signal 90 degrees out of phase with the command signal;
   e. a multiplier circuit connected to the phase shift circuit and the integrating amplifier for producing a steering signal; and
   f. a summing circuit responsive to the steering signal and the command signal for summing said signal and producing a corrected command signal.
   e. a multiplier circuit connected to the phase shift c-circuit and the integrating amplifier for producing a steering signal; and
   f. a summing circuit responsive to the steering signal and the command signal for summing said signal and producing a corrected command signal.

* * * * *